Patented Apr. 5, 1932

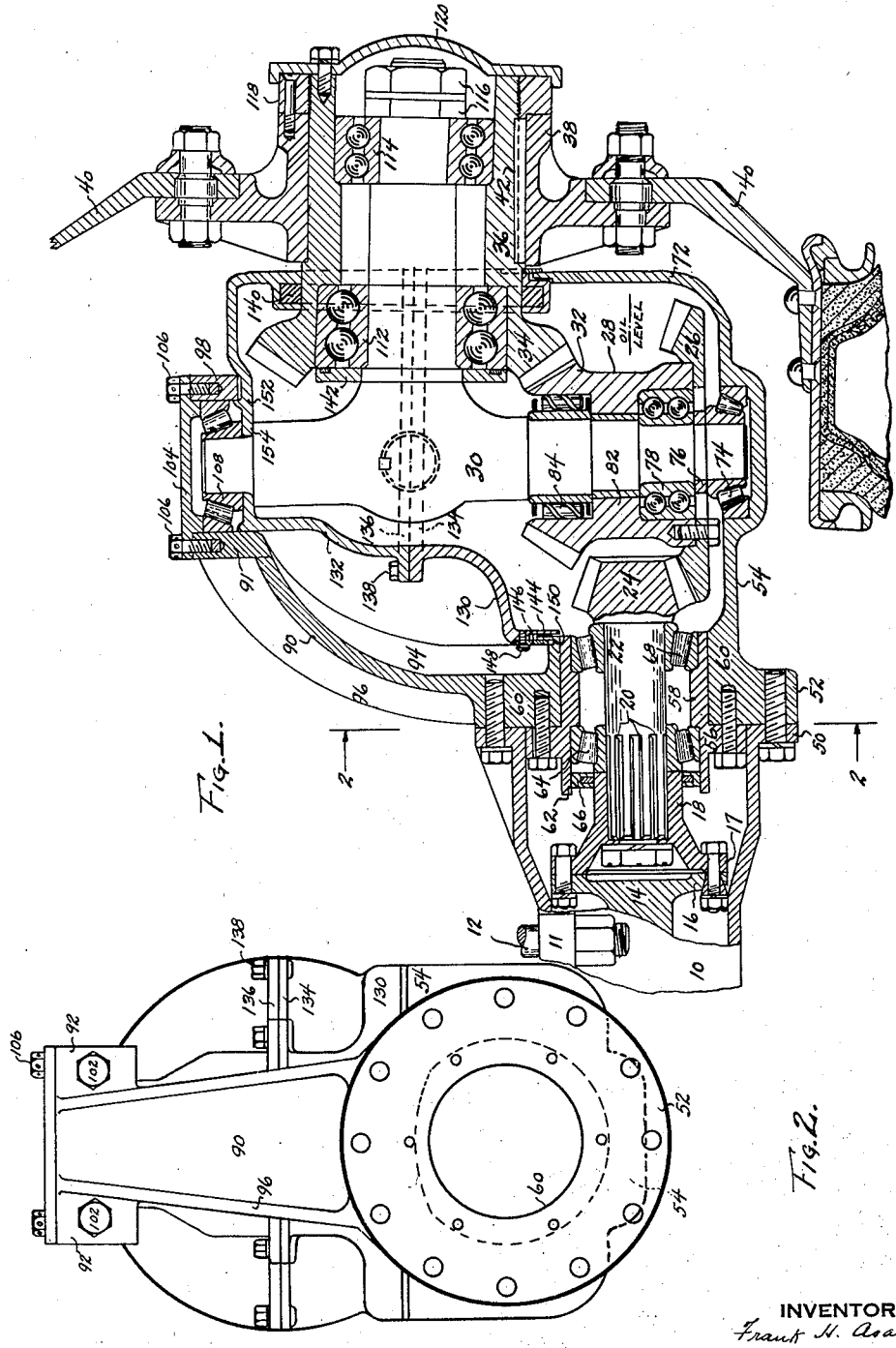

1,852,226

UNITED STATES PATENT OFFICE

FRANK H. ASAM, OF DETROIT, MICHIGAN

FRONT WHEEL DRIVE

Application filed May 1, 1931. Serial No. 534,374.

This invention relates to front wheel drive mechanisms for automobiles.

Front wheel drive mechanisms, as heretofore constructed, have been of two types; one employing gears connecting the power axle to the wheel, and the other employing universal joints for this purpose. The particular class of drive with which this application is concerned is the first class, namely, that which employs gears for connecting the power axle with the wheel.

Previous constructions employing gears have been faulty in that no efficient means for the retention of a body of lubricating oil in the housing around the gears was provided. In order to overcome leakage of lubricating oil from the housings, sealing rings of various types have been used, but since sealing rings are not as efficient as they might be, and since in the prior art constructions, many sealing rings were necessary, each usually being of a number of pieces, effective seals could not be maintained.

An object of this invention, therefore, is a construction of the character described above wherein a housing surrounding the king pin and containing a quantity of lubricating oil is provided, the housing being so constructed that escape of oil therefrom is almost impossible, in the normal operation of the vehicle.

A still further object is a front wheel drive including a main support having a bowl shaped part and an upwardly extending part, in the upper extremity of which and in the bowl of which the king pin is journalled, the drive shaft passing thru an aperture in the side wall of the bowl for driving engagement with gears and collars provided for transmitting power from the power axle to the wheel. The bowl is filled with lubricating oil to the center line of the drive shaft, this level being a considerable distance below the level of the bowl edge whereby escape of oil from the bowl is prevented.

It is further contemplated to provide a two part housing around the king pin, the upper wall of the housing being apertured so that the upper part of the king pin can project therethru, the lower edge being sealed to the upper edge of the bowl by a seal which permits relative rotation or steering movement between the housing and the bowl. The side wall of the housing has an aperture thru which projects the horizontal part of the king pin and a driven collar, keyed to the wheel and journalled on this king pin part, there being a one piece seal between the collar and the housing at this aperture.

Still further objects will readily occur to those skilled in the art upon reference to the following description and the accompanying drawings in which Fig. 1 is a sectional view of the drive.

Fig. 2 is a partial end view, taken as if on the line 2—2 of Fig. 1.

The drive illustrated in the drawings is enclosed within a front axle housing 10 having thereon a spring pad 11 and spring bolts, one of which is indicated at 12. Inside the housing is the power axle 14 which is driven thru a differential between the wheels, by a drive shaft, not shown, which passes under the motor to the transfer case, also not shown.

The power axle 14 has a flange 16 to which is bolted the flange 17 of a power collar 18. Inside the latter and connected thereto by the fixed keys 20, is a jackshaft 22 having a pinion gear 24 on its end. The gear 24 is in mesh with a ring gear 26 bolted to the lower end of the driving collar 28 rotatably mounted on the vertical part of the T shaped king pin 30. The upper end of this collar is formed as a pinion gear 32 which is in mesh with the gear 34 formed as part of the driven collar 36 rotatably mounted on the horizontal part of the king pin. To the outer end of the driven collar the hub 38 of the wheel 40 is fixed by one or more keys 42.

The foregoing parts, which serve to transfer driving power from the power axle 14 to the wheel 40 in an efficient and simple manner, are suitably mounted on frictionless bearings, and are enclosed within suitable housings which will now be described.

The axle housing 10 is provided with a flange 50 to which is bolted the annular flange 52 of the main support 54. Bolted to the flange 52 is a more or less cylindrical member 56 which has a collar part 58 within the cylinder 60 of the main support 54, and a second collar part 62 which is provided with a tapered roller bearing 64 for the shaft 22, and with an oil retaining ring device 66 engaging the power collar 18. The collar 58 is also provided with a tapered roller bearing 68 for the shaft 22.

The lower part of the main support 54 is more or less bowl shaped, it having a vertical flange 72 which is continuously peripheral, except where pierced by the hole thru which passes the shaft 22. The bottom of this support is provided with a tapered roller bearing 74 for the lower end of the king pin 30 and above this bearing, and supported on a bushing 76 is a bearing 78, surrounding the king pin, and rotatably supporting the driving collar 28. Above the bearing 78, and spaced therefrom by an annular shoulder 82 projecting internally from the collar 28, is another bearing 84 of the roller type, which provides a frictionless support for the driving collar.

The upper part of the main support includes a curved and bowed portion 90 which projects upwardly from its cylindrical part 60 and terminates in a semi-annular piece 91 having two horizontal wings 92. The portion 90 is also provided with internal ribs 94 and external ribs 96, as indicated. For cooperation with the semi-annular winged piece 91, there is provided a second semi-annular winged piece 98 having wings (not shown) which are bolted to the wings 92 by the bolts 102, the whole being surmounted by the cap plate 104 held to the parts 91 and 98 by the bolts 106. Disposed within the parts 91 and 98 is a tapered roller bearing 108 which rotatably supports the upper end of the king pin 30.

The driven collar 36 is rotatably supported on the horizontal part of the king pin 30 on two ball bearings 112 and 114, and is provided with a pair of nuts 116 which maintain the parts in assembly. To the collar is threaded a ring 118 which is also bolted to the wheel hub 38, there being a hub cap 120 bolted to the ring.

The king pin is surrounded by a housing which includes two parts 130 and 132, which are bolted together on their parting flanges 134 and 136 by bolts 138. They are provided with semi-circular cut outs (not shown) which together form an aperture thru which the horizontal part of the king pin projects, and this aperture is sealed by an oil retaining one-piece ring 140 engaging the driven collar 36. Another oil ring 142 seals the collar 36 from the king pin.

The lower housing part 130 is provided with a flange 144 which fits inside the upper edge of the bowl 72, and a ring 146 secured to this flange by screws 148 is adapted to fit within the groove 150 in the bowl or support 72 to seal the housing with respect to the support. Another seal between the housing and the support is provided at the upper end of the king pin, and includes the horizontal apertured ledge 152 which fits over the upper end of the king pin resting on a shoulder 154 of the latter.

The bowl 72 is filled with oil to the level of the center line of shafts 14 and 22 and the rotating gear 24, which is only partially submerged sprays this oil onto the gear 32 and the roller bearing 84, thus lubricating the meshed teeth of gears 32 and 34, as indicated. The oil in the bowl can not leak out of the latter, since its level is below the upper edge thereof. Further, any tendency for leakage thru the line of clearage between the housing and the bowl is resisted by the seal and ring construction at this point.

The horizontal part of the king pin is surrounded by grease which lubricates bearings 112 and 114, the grease being retained in place by the hub cap 120 and the ring 142. Grease is also packed around the bearing 108 and this is retained in place by the plate 104 and ledge 152 bearing on king pin shoulder 154.

It will be observed that king pin 30, together with its housings 130 and 132, its driven collar 36 and the wheel 40 may be steered or rotated on the vertical axis of the king pin, the seal at 144—146—148 between the housing and the bowl preventing leakage of oil from the bowl, regardless of the position of these parts. Further, the king pin and housing may move or shift slightly with the wheel, with respect to the bowl, without interference. Further, all the working parts of the drive are fully enclosed in a continuous lubricant filled container which includes housing 10, the bowl of support 54, the housings 130—132, the plate 104, the collar 36, and the hub cap 120, this container being so constructed that the parts therein are shielded from external road débris, mud, grit, etc., and are lubricated internally.

Now having described the invention and the preferred embodiment thereof, it is to be understood that the said invention is to be limited, not to the specific details herein set forth, but only by the scope of the claims which follow.

What I claim is:

1. A front wheel drive for vehicles including an axle housing, a main support having an apertured bowl shaped part sealed to the axle housing and an upwardly projecting part, a T-shaped king pin whose vertical leg is supported in bearings in the bowl shaped part and in the upper extremity of the upwardly projecting part, the horizontal leg of the king pin being above the bowl, a drive shaft projecting thru the aperture in the side wall of the bowl, a collar rotatably supported on the lower part of the vertical leg of the king pin and in driving engagement with the end of the drive shaft, a collar rotatably supported on the horizontal leg of the king pin and in driving engagement with the first mentioned collar, and a wheel fixed to the second collar.

2. A front wheel drive for vehicles including an axle housing, a main support having an apertured bowl shaped part sealed to the axle housing and an upwardly projecting part, a T-shaped king pin whose vertical leg is supported in bearings in the bowl shaped part and in the upper extremity of the upwardly projecting part, the horizontal leg of the king pin being above the bowl, a drive shaft projecting thru the aperture in the side wall of the bowl, a collar rotatably supported on the lower part of the vertical leg of the king pin and in driving engagement with the end of the drive shaft, a collar rotatably supported on the horizontal leg of the king pin and in driving engagement with the first mentioned collar, and a wheel fixed to the second collar, and a housing surrounding the upper part of the vertical leg of the king pin and having a lower edge sealed to the upper edge of the bowl.

3. A front wheel drive for vehicles including an axle housing, a main support having an apertured bowl shaped part sealed to the axle housing and an upwardly projecting part, a T-shaped king pin whose vertical leg is supported in bearings in the bowl shaped part and in the upper extremity of the upwardly projecting part, the horizontal leg of the king pin being above the bowl, a drive shaft projecting thru the aperture in the side wall of the bowl, a collar rotatably supported on the lower part of the vertical leg of the king pin and in driving engagement with the end of the drive shaft, a collar rotatably supported on the horizontal leg of the king pin and in driving engagement with the first mentioned collar, and a wheel fixed to the second collar, and a housing surrounding the upper part of the vertical leg of the king pin and having a lower edge sealed to the upper edge of the bowl, a wall of the housing having an aperture thru which the horizontal leg of the king pin and the second collar project.

4. A front wheel drive for vehicles including an axle housing, a main support having an apertured bowl shaped part sealed to the axle housing and an upwardly projecting part, a T-shaped king pin whose vertical leg is supported in bearings in the bowl shaped part and in the upper extremity of the upwardly projecting part, the horizontal leg of the king pin being above the bowl, a drive shaft projecting thru the aperture in the side wall of the bowl, a collar rotatably supported on the lower part of the vertical leg of the king pin and in driving engagement with the end of the drive shaft, a collar rotatably supported on the horizontal leg of the king pin and in driving engagement with the first mentioned collar, and a wheel fixed to the second collar, and a housing surrounding the upper part of the vertical leg of the king pin and having a lower edge sealed to the upper edge of the bowl, a wall of the housing having an aperture thru which the horizontal leg of the king pin and the second collar project, the edge of this aperture being sealed to the second collar.

5. A front wheel drive for vehicles including an axle housing, a main support having an apertured bowl shaped part sealed to the axle housing and an upwardly projecting part, a T-shaped king pin whose vertical leg is supported in bearings in the bowl shaped part and in the upper extremity of the upwardly projecting part, the horizontal leg of the king pin being above the bowl, a drive shaft projecting thru the aperture in the side wall of the bowl, a collar rotatably supported on the lower part of the vertical leg of the king pin and in driving engagement with the end of the drive shaft, a collar rotatably supported on the horizontal leg of the king pin and in driving engagement with the first mentioned collar, and a wheel fixed to the second collar, and a housing surrounding the upper part of the vertical leg of the king pin and having a lower edge sealed to the upper edge of the bowl, a wall of the housing having an aperture thru which the horizontal leg of the king pin and the second collar project, the edge of this aperture being sealed to the second collar, and means sealing the outer end of the second collar.

6. A front wheel drive for vehicles including an axle housing, a main support having an apertured bowl shaped part sealed to the axle housing and an upwardly projecting part, a T-shaped king pin whose vertical leg is supported in bearings in the bowl shaped part and in the upper extremity of the upwardly projecting part, the horizontal leg of the king pin being above the bowl, a drive shaft projecting thru the aperture in the side wall of the bowl, a collar rotatably supported on the lower part of the vertical leg of the king pin and in driving engagement with the end of the drive shaft, a collar rotatably supported on the horizontal leg of the king pin and in driving engagement with the first mentioned collar, and a wheel fixed to the second collar, and a housing surrounding the upper part of the vertical leg of the king pin and having a lower edge sealed to the upper edge of the bowl, the upper end of the king pin projecting thru and sealed to the upper wall of the housing.

7. A front wheel drive for vehicles including an axle housing, a main support having an apertured bowl shaped part sealed to the axle housing and an upwardly projecting part, a T-shaped king pin whose vertical leg is supported in bearings in the bowl shaped part and in the upper extremity of the upwardly projecting part, the horizontal leg of the king pin being above the bowl, a drive shaft projecting thru the aperture in the side wall of the bowl, a collar rotatably supported on the lower part of the vertical leg of the king pin and in driving engagement with the horizontal leg of the king pin and in driving engagement with the first-mentioned collar, and a wheel fixed to the second collar, and a housing surrounding the upper part of the vertical leg of the king pin and having a lower edge sealed to the upper edge of the bowl, a wall of the housing having an aperture thru which the horizontal leg of the king pin and the second collar project, the edge of this aperture being sealed to the second collar, the housing being of two parts which are joined to each other on a substantially horizontal plane passing thru the aperture in the side wall of the housing.

8. A front wheel drive for vehicles including an axle housing, a main support having an apertured bowl shaped part sealed to the axle housing and an upwardly projecting part, a T-shaped king pin whose vertical leg is supported in bearings in the bowl shaped part and in the upper extremity of the upwardly projecting part, the horizontal leg of the king pin being above the bowl, a drive shaft projecting thru the aperture in the side wall of the bowl, a collar rotatably supported on the lower part of the vertical leg of the king pin and in driving engagement with the end of the drive shaft, a collar rotatably supported on the horizontal leg of the king pin and in driving engagement with the first mentioned collar, and a wheel fixed to the second collar, the upper extremity of the upwardly extending part of the support being of two parts which are joined to each other on a substantially vertical plane passing thru the vertical axis of the king pin.

In testimony whereof I sign this specification.

FRANK H. ASAM.